(12) United States Patent
Nanba et al.

(10) Patent No.: US 7,674,555 B2
(45) Date of Patent: Mar. 9, 2010

(54) ELECTRODE MATERIAL, AND PRODUCTION METHOD AND USE THEREOF

(75) Inventors: Youichi Nanba, Kanagawa (JP); Satoshi Iinou, Nagano (JP); Tsutomu Masuko, Nagano (JP)

(73) Assignee: Showa Denko K.K., Tokyo (JP)

( * ) Notice: Subject to any disclaimer, the term of this patent is extended or adjusted under 35 U.S.C. 154(b) by 1323 days.

(21) Appl. No.: 10/536,443

(22) PCT Filed: Nov. 25, 2003

(86) PCT No.: PCT/JP03/14997

§ 371 (c)(1),
(2), (4) Date: May 25, 2005

(87) PCT Pub. No.: WO2004/049473

PCT Pub. Date: Jun. 10, 2004

(65) Prior Publication Data

US 2006/0035149 A1    Feb. 16, 2006

Related U.S. Application Data

(60) Provisional application No. 60/432,250, filed on Dec. 11, 2002, provisional application No. 60/430,646, filed on Dec. 4, 2002.

(30) Foreign Application Priority Data

Nov. 26, 2002   (JP) ............................. 2002-342689
Dec. 2, 2002    (JP) ............................. 2002-350094

(51) Int. Cl.
*H01M 4/48* (2006.01)

(52) U.S. Cl. ................. 429/231.8; 429/218.1; 429/128; 429/232; 429/217; 429/338; 429/337; 429/341; 252/182.1

(58) Field of Classification Search .............. 429/218.1, 429/231.8, 128, 232, 217, 338, 337, 341; 252/182.1

See application file for complete search history.

(56) References Cited

U.S. PATENT DOCUMENTS

| | | | |
|---|---|---|---|
| 6,300,013 | B1 | 10/2001 | Yamada et al. |
| 6,440,610 | B1 | 8/2002 | Sheem et al. |

FOREIGN PATENT DOCUMENTS

| | | | |
|---|---|---|---|
| CN | 1272698 | A | 11/2000 |
| CN | 1335651 | A | 2/2002 |
| CN | 1374712 | A | 10/2002 |
| EP | 0 883 199 | A1 | 12/1998 |
| EP | 1 045 465 | A2 | 10/2000 |
| EP | 1 052 712 | A1 | 11/2000 |
| EP | 1 396 894 | A2 | 3/2004 |
| JP | 2000-173612 | * | 6/2000 |
| JP | 2000-173612 | A | 6/2000 |
| JP | 2001-102052 | A | 4/2001 |
| JP | 2001-196064 | A | 7/2001 |
| JP | 2002-8652 | A | 1/2002 |
| JP | 2002-255529 | A | 9/2002 |

* cited by examiner

*Primary Examiner*—Laura S Weiner
(74) *Attorney, Agent, or Firm*—Sughrue Mion, PLLC

(57) ABSTRACT

An electrode material comprising a particle containing at least one member selected from the particles containing silicon, tin, silicon compound and tin compound, and fibrous carbon. The particle includes: (1) a particle comprising at least one member of a silicon particle, tin particle, particle containing a lithium-ion-intercalatable/releasable silicon compound and particle containing a lithium-ion-intercalatable/releasable tin compound; or (2) a particle comprising a silicon and/or silicon compound-containing carbonaceous material deposited onto at least a portion of the surfaces of a carbon particle having a graphite structure. The lithium secondary battery using the electrode material as a negative electrode has high discharging capacity and is excellent in cycle characteristics and characteristics under a load of large current.

25 Claims, No Drawings

ELECTRODE MATERIAL, AND PRODUCTION METHOD AND USE THEREOF

CROSS REFERENCE TO THE RELATED APPLICATIONS

This is an application filed pursuant to 35 U.S.C. Section 111(a) with claiming the benefit of U.S. Provisional application Ser. No. 60/430,646 filed Dec. 4, 2002 and U.S. Provisional application Ser. No. 60/432,250 filed Dec. 11, 2002 under the provision of 35 U.S.C. Section 111(b), pursuant to 35 U.S.C. Section 119(e)(1).

TECHNICAL FIELD

The present invention relates to an electrode material, production method and use thereof. Specifically, the present invention relates to an electrode material to be used for a negative electrode in a non-aqueous electrolyte secondary battery having high capacity and being excellent in cycle characteristics and characteristics under a load of large current, to a production method thereof, to an electrode formed of the material, and to a non-aqueous electrolyte secondary battery including the electrode. More particularly, the present invention relates to an electrode material to be used for a negative electrode in lithium secondary battery, to an electrode formed of the material, and to a lithium secondary battery including the electrode.

BACKGROUND ART

In accordance with development of portable apparatuses having small size, light weight and high performance, demand has arisen for a lithium secondary battery of high capacity. In connection with this demand, studies have been performed on a negative electrode material having a capacity exceeding 372 mAh/g, which is the theoretical capacity of graphite, which has conventionally been employed as a negative electrode material for producing a lithium secondary battery.

Specifically, a non-carbonaceous material for a negative electrode exhibiting larger capacity such as a material containing silicon, tin, aluminum and tungsten element has been proposed as a replacement for such a graphite negative electrode material.

For example, JP-A-2000-173612 (the term "JP-A" as used herein means Japanese Laid-Open (kokai) Patent Application No.) discloses a negative electrode material prepared by coating silicon elemental particles with a silicon-containing solid solution layer or an intermetallic compound layer, and depositing a carbonaceous material containing fibrous carbon onto a portion or the entirety of the surfaces of the thus-coated particles. JP-A-2000-357515 (U.S. Pat. No. 6,300,013) discloses a mixture of a silicon compound with a carbon material as a negative electrode material.

However, when lithium ions are intercalated into or released from such a non-carbonaceous negative electrode material; i.e., when doping or dedoping of lithium ions is performed, particles of an active substance undergo a great change in volume, and microspaces are generated between the active substance particles, leading to a quantitative reduction in a portion of the electrode material that is effectively employed for storing-electrical charges. Specifically, cracking occurs in the electrode material as a result of such volume change, the active substance particles are micronized, and microspaces are generated between the thus-micronized particles, leading to interruption of electronic conduction networks caused by contact between the particles, and a quantitative increase in a portion of the electrode material that cannot participate in electrochemical reaction. Conceivably, this phenomenon causes problems, including decrease in charging/discharging capacity and an increase in internal electrical resistance.

As described above, when lithium ions are intercalated into or released from the non-carbonaceous negative electrode material, the volume of the active substance particles changes greatly. Therefore, the electrode material has problems that the material is considerably impaired by repeating charging/discharging cycles, and that its internal electrical resistance (particularly at low temperature) is increased.

The electrode material disclosed in JP-A-2000-173612 is prepared by depositing a carbonaceous material containing fibrous carbon onto silicon particles serving as nuclei. Therefore, when the electrode material undergoes charging/discharging cycles, the particles constituting the material are micronized, and thus each particle fails to maintain its shape, and the particles are separated from one another, leading to problems in terms of, for example, cycle characteristics and irreversible capacity.

In the electrode material disclosed in JP-A-2000-357515 (U.S. Pat. No. 6,300,013), in which the ratio between the average particle size of silicon compound particles and that of carbon material particles is regulated, doping/dedoping between lithium ions and the silicon compound particles is performed within microspaces formed by the carbon material particles, which have a particle size greater than that of the silicon compound particles. When this electrode material undergoes repeated charging/discharging cycles, these particles are separated from one another, leading to problems in terms of, for example, cycle characteristics and irreversible capacity.

On the other hand, JP-A-2002-8652 discloses a negative electrode material prepared by depositing finely divided silicon particles onto graphite powder and forming a carbon coating on the graphite powder. JP-A-2002-255529 discloses a carbonaceous material prepared by depositing, onto graphite particles, composite particles formed of silicon and an electrically conductive carbon material, and coating the composite particles with amorphous carbon.

However, the electrode material disclosed in JP-A-2002-8652 has problems that expansion or shrinkage of the silicon particles occurs along with charging/discharging cycles, and that contact between the silicon particles and the graphite powder fails to be maintained, and thus electrical conductivity is lowered, leading to deterioration of cycle characteristics.

In the carbonaceous material disclosed in JP-A-2002-255529, silicon and an electrically conductive carbon material (e.g., carbon black) are completely coated with amorphous carbon. Therefore, the carbonaceous material involves the following problems that electrical conductivity is low and large-current characteristics are impaired, and that contact between the particles fails to be maintained due to the expansion or shrinkage of the particles in charging/discharging, leading to deterioration of cycle characteristics.

DISCLOSURE OF THE INVENTION

The objects of the present invention are to provide an electrode material suitable as a negative electrode material for producing a lithium ion secondary battery having high charging/discharging capacity, excellent characteristics at charging/discharging cycle, excellent characteristics under a load of large current, small irreversible capacity and low internal electrical resistance, particularly at low temperature, and to provide a method for producing the electrode material.

The present invention provides the following.

1. An electrode material comprising a particle containing silicon and/or tin, and fibrous carbon, wherein the particle is: (1) a particle comprising at least one member of a silicon particle, tin particle, particle containing a lithium-ion-intercalatable/releasable silicon compound and particle containing a lithium-ion-intercalatable/releasable tin compound; or (2) a particle comprising a silicon and/or silicon compound-containing carbonaceous material deposited onto at least a portion of the surfaces of a carbon particle having a graphite structure, where the carbonaceous material is obtained through thermal treatment of a composition containing a polymer.
2. The electrode material as described in 1 above, wherein the particle containing silicon and/or tin is a particle comprising at least one member of a silicon particle, tin particle, particle containing a lithium-ion-intercalatable/releasable silicon compound and particle containing a lithium-ion-intercalatable/releasable tin compound (hereinafter referred to as "Particle A"), and the fibrous carbon is vapor grown carbon fiber.
3. The electrode material as described in 2 above, wherein the lithium-ion-intercalatable/releasable silicon compound is a compound represented by the formula $M_xSi$, wherein M represents an element other than Li, and x is at least 0.01.
4. The electrode material as described in 3 above, wherein M is an element selected from B, C, N, O, S, P, Na, Mg, Al, K, Ca, Ti, V, Cr, Mn, Fe, Co, Ni, Cu, Zn, Mo, Ru, Rh, Pd, Pt, Be, Nb, Nd, Ce, W, Ta, Ag, Au, Cd, Ga, In, Sb and Ba.
5. The electrode material as described in 2 above, wherein the lithium-ion-intercalatable/releasable tin compound is tin alloy, tin oxide, tin sulfide, tin halide or stannide.
6. The electrode material as described in 2 above, wherein the amount of the vapor grown carbon fiber falls within a range of 0.01 to 20 mass %.
7. The electrode material as described in 2 above, wherein each fiber filament of the vapor grown carbon fiber has a hollow space extending along its center axis, and has an outer diameter of 2 to 1,000 nm and an aspect ratio of 10 to 15,000.
8. The electrode material as described in 7 above, wherein the vapor grown carbon fiber contains branched carbon fiber.
9. The electrode material as described in 2 above, wherein the amount of the vapor grown carbon fiber is 0.1 to 30 parts by mass on the basis of 100 parts by mass of Particle A.
10. The electrode material as described in 2 above, wherein the vapor grown carbon fiber contains carbon having, at a (002) plane, an average interlayer distance ($d_{002}$) of 0.344 nm or less as measured by means of X-ray diffractometry.
11. The electrode material as described in 2 above, wherein Particle A has an average particle size of 0.3 μm to 70 μm.
12. The electrode material as described in 11 above, wherein Particle A contains substantially no particles having an average particle size of 0.1 μm or less and/or 85 μm or more.
13. The electrode material as described in 2 above, wherein at least a portion of the surface of Particle A is coated with a carbonaceous material, and the thickness of the carbonaceous material coating is 1 to 30,000 nm.
14. The electrode material as described in 13 above, wherein the carbonaceous material is obtainable through thermal treatment of a composition containing a polymer selected from the group consisting of phenolic resin, polyvinyl alcohol resin, furan resin, cellulose resin, polystyrene resin, polyimide resin and epoxy resin.
15. The electrode material as described in 14 above, wherein the composition containing a polymer is a composition containing a phenolic resin, and a drying oil or a fatty acid derived therefrom.
16. The electrode material as described in 1 above, comprising carbon particles having a graphite structure, a silicon and/or silicon compound containing carbonaceous material deposited onto at least a portion of the surfaces of the carbon particles and fibrous carbon, wherein the carbonaceous material is obtained through thermal treatment of a composition containing a polymer.
17. The electrode material as described in 16 above, wherein the silicon and/or silicon compound-containing carbonaceous material further comprises fibrous carbon.
18. The electrode material as described in 16 above, wherein the carbon particles contain a carbon particle having on its surface silicon and/or silicon compound in the form of finely divided particles by the mediation of the carbonaceous material.
19. The electrode material as described in 16 above, wherein the carbon particles contain a carbon particle having on its surface fibrous carbon by the mediation of the carbonaceous material.
20. The electrode material as described in 16 above, wherein the carbon particles contain a carbon particle having on its surface silicon and/or silicon compound in the form of finely divided particles and fibrous carbon by the mediation of the carbonaceous material.
21. The electrode material as described in 16 above, wherein the amount of the silicon and/or silicon compound is 1 to 20 mass %.
22. The electrode material as described in 16 above, wherein the polymer contains at least one species selected from the group consisting of phenolic resin, polyvinyl alcohol resin, furan resin, cellulose resin, polystyrene resin, polyimide resin and epoxy resin.
23. The electrode material as described in 16 above, wherein the composition containing a polymer is a composition containing phenolic resin, and a drying oil or a fatty acid derived therefrom.
24. The electrode material as described in 16 above, wherein the carbon particles having a graphite structure and/or the carbonaceous material contain boron.
25. The electrode material as described in 16 above, wherein the fibrous carbon contains carbon having, at a (002) plane, an average interlayer distance ($d_{002}$) of 0.344 nm or less as measured by means of X-ray diffractometry.
26. The electrode material as described in 16 above, wherein the fibrous carbon is vapor grown carbon fiber, each fiber filament of the carbon fiber including a hollow space extending along its center axis and having an outer diameter of 2 to 1,000 nm and an aspect ratio of 10 to 15,000.
27. The electrode material as described in 26 above, wherein the vapor grown carbon fiber contains branched carbon fiber.
28. The electrode material as described in 26 above, wherein the amount of the vapor grown carbon fiber is 0.1 to 30 parts by mass on the basis of 100 parts by mass of the carbon particles having a graphite structure.
29. The electrode material as described in 16 above, wherein the carbon particles having a graphite structure have an average particle size of 5 μm to 70 μm.
30. The electrode material as described in 29 above, wherein the carbon particles having a graphite structure contain particles having an average particle size of 3 μm or less and/or 85 μm or more in an amount of 5 mass % or less.

31. The electrode material as described in 16 above, wherein the carbon particles having a graphite structure are coated with the carbonaceous material, and the thickness of the carbonaceous material coating is 1 to 30,000 nm.

32. The electrode material as described in 16 above, wherein the silicon compound is at least one species selected from among silicon carbide silicon dioxide and silicon nitride.

33. A method for producing an electrode material comprising;
a step of depositing a composition containing a polymer onto at least a portion of the surfaces of particles comprising at least one member of a silicon particle, tin particle, particle containing a lithium-ion-intercalatable/releasable silicon compound and particle containing a lithium-ion-intercalatable/releasable tin compound;
a step of mixing the resultant particles with fibrous carbon; and a step of thermally treating the particles.

34. The method for producing an electrode material as described in 33 above, wherein the polymer contains a polymer exhibiting adhesion to Particle A.

35. The method for producing an electrode material as described in 33 above, wherein the thermal treatment step is a firing step carried out at a temperature of at least 200° C.

36. A method for producing an electrode material comprising;
a step of depositing a composition containing a polymer onto at least a portion of the surfaces of carbonaceous particles;
a step of mixing the carbonaceous particles with fibrous carbon and silicon and/or silicon compound, to thereby deposit the fibrous carbon and silicon and/or silicon compound onto the carbonaceous particles by the mediation of the composition containing a polymer; and
a subsequent step of thermally treating the resultant carbonaceous particles.

37. A method for producing an electrode material comprising
a step in which a composition containing a polymer, fibrous carbon and silicon and/or silicon compound are mixed together, and the carbonaceous particles are mixed with the mixture, to thereby deposit the fibrous carbon and silicon and/or silicon compound onto the carbonaceous particles by the mediation of the composition containing a polymer; and a subsequent step of thermally treating the resultant carbonaceous particles.

38. The method for producing an electrode material as described in 36 or 37 above, wherein the polymer contains a polymer exhibiting adhesion to carbon.

39. The method for producing an electrode material as described in 36 or 37 above, wherein the polymer contains at least one species selected from the group consisting of phenolic resin, polyvinyl alcohol resin, furan resin, cellulose resin, polystyrene resin, polyimide resin and epoxy resin.

40. The method for producing an electrode material as described in 36 or 37 above, wherein the polymer contains a phenolic resin, and a drying oil or a fatty acid derived therefrom.

41. The method for producing an electrode material as described in 37 above, which comprises;
a step in which a composition containing a polymer containing a phenolic resin and a drying oil or a fatty acid derived therefrom, fibrous carbon, and silicon and/or silicon compound is deposited onto carbonaceous particles, and the composition deposited onto the carbonaceous particles is subsequently cured; and
a step of thermally treating the resultant carbonaceous particles, which is carried out after the first step is repeated 1 to 20 times.

42. The method for producing an electrode material as described in 36 or 37 above, wherein a boron compound is added to the carbonaceous particles in the thermal treatment step.

43. The method for producing an electrode material as described in 36 or 37 above, wherein the thermal treatment step is carried out at a temperature of at least 2,000° C.

44. The method for producing an electrode material as described in 36 or 37 above, wherein the fibrous carbon is vapor grown carbon fiber, and the vapor grown carbon fiber is mixed with the carbonaceous particles such that the amount of the vapor grown carbon fiber is 0.1 to 30 parts by mass on the basis of 100 parts by mass of the carbonaceous particles.

45. The electrode material produced through a method as described in any one of 33 to 44 above.

46. An electrode paste comprising an electrode material as described in any one of 1 to 32 and 35 above and a binder.

47. An electrode comprising an electrode paste as described in 46 above.

48. A secondary battery comprising an electrode as described in 47 above.

49. The secondary battery as described in 48 above, which comprises a non-aqueous electrolytic solvent and an electrolyte, wherein the non-aqueous electrolytic solvent is at least one species selected from the group consisting of ethylene carbonate, diethyl carbonate, dimethyl carbonate, methyl ethyl carbonate, γ-butyrolactone and propylene carbonate.

The present invention is described in details hereinafter.

[Electrode Material]

The electrode material of the present invention comprises particles containing at least one member selected from silicon, tin, silicon compound and tin compound, and fibrous carbon. Specifically, modes for carrying out the invention include the following two: Mode 1 using silicon and/or tin-containing particles as nuclei and Mode 2 using carbon particles having a graphite structure as nuclei, wherein a silicon and/or silicon compound-containing carbonaceous material is deposited onto at least a portion of the surfaces of the carbon particles. Each of the two modes is described in detail.

[1] Mode 1

(1-1) Particles Serving as Nuclei

A particle serving as nuclei includes a particle comprising at least one member of a silicon particle, tin article, particle containing a lithium-ion-intercalatable/releasable silicon compound and particle containing a lithium-ion-intercalatable/releasable tin compound (hereinafter referred to as "Particle A"). The particles may be particles integrating the above-mentioned particles with other organic or inorganic compounds.

As used herein, intercalating an lithium ion refers to the phenomenon that in a lithium ion battery, when the battery undergoes charging, lithium ions are released from a positive electrode, and then the lithium ions are intercalated into microspaces between active substance particles constituting a negative electrode material, to thereby form a compound. This may be called the "doping" phenomenon. Meanwhile, releasing an lithium ion refers to the phenomenon that lithium contained in the negative electrode material is released therefrom in the form of lithium ions during the course of discharging. This may be called the "dedoping" phenomenon. During the use of the lithium ion battery, this doping/dedoping cycle is repeated.

Each of the particles containing a lithium-ion-intercalatable/releasable silicon compound and/or a tin compound may be a primary particle formed of a compound containing a silicon atom, a particle formed of a compound containing a tin atom, a particle formed of a compound containing a silicon atom and a compound containing a tin atom, or a secondary agglomerate particle formed of integrating these particles.

The particles may be a lump-like shape, a flaky shape, a spherical shape or a fibrous shape. Preferably, the particles assume a spherical shape or a lump-like shape.

The central particle size (D50) of the particles as measured by use of a laser-diffraction-type particle size distribution measuring apparatus is preferably about 0.3 to about 70 μm, more preferably 0.3 to 50 μm, much more preferably 0.5 to 20 μm. Preferably, the particles contain substantially no particles having a particle size of 0.1 μm or less and/or 85 μm or more.

The particle size is regulated within the above-preferred range for the following reasons. When the particle size of the particles is large, the particles are micronized through charging/discharging reaction, leading to deterioration of cycle characteristics. In contrast, when the particle size of the particles is small, the particles fail to efficiently participate in electrochemical reaction with lithium ions, leading to decrease in capacity and deterioration of, for example, cycle characteristics.

In order to regulate the particle size, any known technique of pulverization or classification may be employed. Specific examples of the apparatus employed for pulverization include a hammer mill, a jaw crusher and an impact mill. The classification may be air classification or classification employing a sieve. Examples of the apparatus employed for air classification include a turbo classifier and a turbo plex.

The silicon compound may be a compound represented by the formula $M_xSi$, wherein M represents an element other than Li and x is 0.01 or more. In this formula, M is B, C, N, O, S, P, Na, Mg, Al, K, Ca, Ti, V, Cr, Mn, Fe, Co, Ni, Cu, Zn, Mo, Ru, Rh, Pd, Pt, Be, Nb, Nd, Ce, W, Ta, Ag, Au, Cd, Ga, In, Sb or Ba. In this formula, x is preferably 0.1 or more, more preferably 0.3 or more.

The silicon compound may be, for example, an alloy formed of silicon and an alkaline earth metal, a transition metal or a metalloid. Preferably, the compound is a solid solution alloy or a eutectic alloy, which is formed of silicon and Be, Ag, Al, Au, Cd, Ga, In, Sb or Zn. The average particle size of particles constituting such an alloy is 0.3 to 70 μm, preferably 0.3 to 40 μm.

The silicon compound may be a silicide; i.e., a compound formed of silicon and a metal, in which the compositional proportions of the constitutive elements do not necessarily correspond to the valence of silicon. The silicide which may be employed include $CaSi$, $CaSi_2$, $Mg_2Si$, $BaSi_2$, $CU_5Si$, $FeSi$, $FeSi_2$, $CoSi_2$, $Ni_2Si$, $NiSi_2$, $MnSi$, $MnSi_2$, $MoSi_2$, $CrSi_2$, $Cr_3Si$, $TiSi_2$, $Ti_5Si_3$, $NbSi_2$, $NdSi_2$, $CeSi_2$, $WSi_2$, $W_5Si_3$, $TaSi_2$, $Ta_5Si_3$, $PtSi$, $V_3Si$, $VSi_2$, $PdSi$, $RuSi$ and $RhSi$.

The silicon compound may be a compound such as $SiO_2$, $SiC$ or $Si_3N_4$.

The tin compound may be tin alloy, tin oxide, tin sulfide, tin halide or stannide. The tin compound include solid solution alloys formed of Sn and Zn, Cd, In or Pb; tin oxides such as $SnO$, $SnO_2$, $Sn_2O_3$, $Sn_3O_4$, $Mg_2SnO_4$, $ZnSnO_4$, $CoSnO_4$, $Na_4SnO_4$, $K_2SnO_3$ and $Na_2SnO_3$; tin sulfides such as $SnS$ and $SnS_2$; tin halides such as $SnX_2$ and $SnX_4$, wherein X represents a halogen atom; and stannides such as $MgSn$, $Mg_2Sn$, $FeSn$, $FeSn_2$, $MoSn$ and $MoSn_2$. The tin compound may be a hydrate such as $SnCl_2 \cdot 2H_2O$, $SnO_2 \cdot nH_2O$ and $SnO \cdot H_2O$.

(1-2) Carbonaceous Material

In the present invention, at least a portion of the surface of Particle A may be coated by the carbonaceous material. The particle coated by the carbonaceous material is obtainable by depositing a composition containing a polymer onto at least a portion of the surface of the Particle A, mixing fibrous carbon (preferably vapor grown carbon fiber) thereto, followed by thermal treatment.

A polymer employed preferably exhibits adhesion to Particle A. Any polymer may be employed, so long as the polymer, when undergoing any treatment such as mixing, stirring, removal of solvent or thermal treatment, exhibits resistance against, for example, compression, bending, exfoliation, impact, tension or tearing such that the polymer causes substantially no exfoliation from the particles. Preferably, the polymer is at least one species selected from the group consisting of phenolic resin, polyvinyl alcohol resin, furan resin, cellulose resin, polystyrene resin, polyimide resin and epoxy resin. More preferable polymers include phenolic resin and polyvinyl alcohol resin.

Particularly when phenolic resin mixed with a drying oil or a fatty acid derived therefrom is employed, a dense carbonaceous material is formed. This seems attributable to a drying-oil-modified phenolic resin obtained through chemical reaction between the phenolic resin and unsaturated bonds of the drying oil, which mitigates decomposition and prevents effervescence during the course of thermal treatment (or firing). The drying oil has, in addition to carbon-carbon double bonds, ester bonds with considerably long alkyl groups, which is considered to relate to, for example, effective removal of gas during the course of firing.

A phenolic resin is produced through reaction between a phenol and an aldehyde. Examples of the phenolic resin which may be employed include non-modified phenolic resins such as novolak and resol; and partially modified phenolic resins. If desired, the phenolic resin may contain rubber such as nitrile rubber. Examples of the phenol include phenol, cresol, xylenol and alkylphenols having an alkyl group of C20 or less.

The phenolic resin containing a drying oil or a fatty acid derived therefrom may be prepared through the following method: a method in which firstly a phenol and a drying oil are subjected to addition reaction in the presence of a strong acid catalyst, and subsequently a basic catalyst is added to the resultant reaction mixture such that the mixture exhibits basicity, followed by formalin addition reaction; or a method in which a phenol is reacted with formalin, and then a drying oil is added to the resultant reaction mixture.

Examples of the drying oil include generally known vegetable oils such as tung oil, linseed oil, dehydrated castor oil, soybean oil and cashew nut oil. Fatty acids derived from these drying oils may be employed. When the drying oil is spread so as to form a thin film and then allowed to stand in air, the drying oil is dried and solidified within a relatively short period of time.

A preferred amount of a drying oil or a fatty acid derived therefrom is 5 to 50 parts by mass on the basis of 100 parts by mass of a phenolic resin obtained through condensation of phenol and formalin. When the amount of a drying oil or a fatty acid derived therefrom exceeds 50 parts by mass, the resultant carbonaceous material exhibits lowered adhesion to Particle A.

When the aforementioned polymer is diluted with a solvent such as acetone, ethanol or toluene to thereby regulate its viscosity, the resultant polymer is readily deposited onto the particles.

Deposition of the polymer is carried out under atmospheric pressure, increased pressure or reduced pressure. Preferably, deposition is carried out under reduced pressure, since affinity between the carbon particles and the polymer is enhanced.

In the case where at least a portion of the surfaces of Particle A is coated with a carbonaceous material (including the case where the entirety of the particle surfaces is coated with the carbonaceous material), the thickness of the resultant coating layer is 1 to 30,000 nm, preferably 5 to 3,000 nm. The thickness of the coating layer may differ from portion to portion, so long as the particles are substantially coated with the carbonaceous material.

(1-3) Mixing and Removal of the Solvent

In the present invention, vapor grown carbon fiber is mixed with Particle A, and the resultant mixture is subjected to stirring, to thereby disperse the vapor grown carbon fiber in the particles. No particular limitations are imposed on the stirring method, and a stirring apparatus such as a ribbon mixer, a screw kneader, a Spartan ryuzer, a Lodige mixer, a planetary mixer or a general purpose mixer may be employed.

In the case where the particles are not coated with the carbonaceous material, no particular limitations are imposed on the stirring temperature and stirring time, so long as the vapor grown carbon fiber is dispersed in the particles. Meanwhile, in the case where the particles are coated with the carbonaceous material, the stirring temperature and stirring time are appropriately determined in accordance with, for example, the components and viscosity of the particles and the polymer. The stirring temperature is generally about 0° C. to about 50° C., preferably about 10° C. to about 30° C.

Alternatively, in order to reduce the viscosity of the aforementioned mixture to 500 Pa·s or less at the mixing temperature, the mixing time is regulated and the composition is diluted with a solvent. In this case, any solvent may be employed, so long as the solvent exhibits good affinity with the polymer and the compound containing a silicon atom and/or a tin atom. Examples of the solvent include alcohols, ketones, aromatic hydrocarbons and esters. Preferred examples include methanol, ethanol, butanol, acetone, methyl ethyl ketone, toluene, ethyl acetate and butyl acetate.

After completion of stirring, it is preferable to remove a portion or the entirety of the solvent. Removal of the solvent may be carried out by means of a known technique such as hot air drying or vacuum drying.

The drying temperature varies depending on, for example, the boiling point and vapor pressure of the employed solvent. Specifically, the drying temperature is 50° C. or higher, preferably 100° C. to 1,000° C. inclusive, more preferably 150° C. to 500° C. inclusive.

Most of known heating apparatuses may be employed for heating and curing. However, from the viewpoint of productivity, an apparatus such as a rotary kiln or a belt-type continuous furnace, which enables continuous treatment, is preferably employed in a production process.

In case of employing phenolic resin as a polymer, the amount of the phenolic resin to be added is preferably 2 to 30 parts by mass, more preferably 4 to 25 parts by mass, much more preferably 6 to 18 parts by mass on the basis of 100 parts by mass of Particle A.

Preferably, Particle A is coated with the carbonaceous material, and subsequently, the thus-coated particles are mixed with the vapor grown carbon fiber. However, Particle A, the polymer-containing composition and the vapor grown carbon fiber may be mixed together at the same time, so long as the vapor grown carbon fiber does not adhere to Particle A.

(1-4) Thermal Treatment Conditions

When the polymer is deposited onto Particle A, the center of each Particle A is not necessarily heated to the maximum temperature, so long as adhesion of the carbonaceous material coating to the surfaces of Particle A, strength of the coating, etc. meet practical requirements.

The particles onto which the polymer-containing composition has been deposited is subjected to thermal treatment at 200° C. or higher. The temperature is 200° C. to 2,000° C., preferably 200° C. to 1,200° C. in the case of firing treatment and 2,000° C. to 3,000° C. in the case of graphitization treatment. The compound containing a silicon atom and/or a tin atom may partially form silicon carbide, silicon oxide, tin oxide, etc., at 200° C. or higher. In the case where the particles are subjected to thermal treatment by use of a known heating apparatus, when the temperature increasing rate falls within a range between the maximum and the minimum temperature increasing rate in the apparatus, the performance of the particles is not considerably affected. However, since the particles are in the form of powder and raise few problems such as cracking, which may occur in, for example, a molded material, the temperature increasing rate is preferably high from the viewpoint of production cost. The time elapsed when the particles are heated from ambient temperature to the maximum temperature is preferably 12 hours or less, more preferably six hours or less, particularly preferably two hours or less.

Any known thermal treatment apparatus, such as an Acheson furnace or a direct electrical heating furnace, may be employed. Such an apparatus is advantageous from the viewpoint of production cost. However, preferably, a furnace having a structure such that the interior of the furnace can be filled with an inert gas such as argon or helium is employed, since the resistance of the particles may be lowered in the presence of nitrogen gas, and the strength of the carbonaceous material may be lowered through oxidation by oxygen. Preferred examples of such a furnace include a batch furnace whose interior enables evacuation and gas substitution, a batch furnace in which the interior atmosphere can be controlled by means of a tubular furnace, and a continuous furnace.

The average particle size of Particle A is preferably 0.3 to 70 µm, more preferably 0.3 to 50 µm, much more preferably 0.5 to 20 µm. The average particle size can be measured by means of the laser diffraction-scattering method. When the average particle size is less than 0.3 µm, aspect ratio tends to become high and specific surface area tends to become large. For example, when a battery electrode is produced, in general, the negative electrode material is mixed with a binder to prepare a paste, and the resultant paste is applied to a collector. When the average particle size of the particles constituting the negative electrode material is less than 0.3 µm, the electrode material contains large amounts of finely divided particles having a size less than 0.1 µm. Therefore, the viscosity of the paste is increased and applicability of the paste is lowered.

When the negative electrode material contains large particles having an average particle size of 85 µm or more, large amounts of irregularities are formed on the surface of the resultant electrode, thereby causing scratches on a separator to be employed in a battery. The negative electrode material containing substantially no particles having an average particle size of 0.1 µm or less and 85 µm or more is preferably employed for forming an electrode.

(1-5) Fibrous Carbon

Fibrous carbon to be employed must exhibit excellent electrical conductivity, and therefore, fibrous carbon having high crystallinity is preferably employed. When an electrode formed from the electrode material of the present invention is incorporated into a lithium ion secondary battery, instantaneous current flow throughout the negative electrode is required. Therefore, preferably, the crystal growth direction of fibrous carbon to be employed is parallel to the axis of each fiber filament of the fiber, and the fiber filament has branches. When the fibrous carbon is branched carbon fiber, electrical connection is readily established between the particles by means of the carbon fiber, whereby electrical conductivity is enhanced.

The fibrous carbon to be employed may be pitch-based carbon, vapor grown carbon fiber, etc., preferably, vapor grown carbon fiber containing carbon crystals grown along the axis of each fiber filament of the fiber, in which each fiber filament has branches.

Vapor grown carbon fiber can be produced through, for example, the following procedure: a gasified organic compound is fed into a high-temperature atmosphere together with iron serving as a catalyst.

The vapor grown carbon fiber to be employed may be as-produced carbon fiber; carbon fiber which has undergone thermal treatment at, for example, 800 to 1,500° C.; or carbon fiber which has undergone graphitization at, for example, 2,000 to 3,000° C. However, as-produced carbon fiber or carbon fiber which has undergone thermal treatment at about 1,500° C. is preferred.

The vapor grown carbon fiber employed in the present invention is preferably branched carbon fiber. Each fiber filament of the branched carbon fiber may have a hollow structure in which a hollow space extends throughout the filament, including a branched portion thereof. Therefore, sheath-forming carbon layers of the filament assume uninterrupted layers. As used herein, the term "hollow structure" refers to a structure in which carbon layers form a sheath. The hollow cylindrical structure encompasses a structure in which sheath-forming carbon layers form an incomplete sheath; a structure in which the carbon layers are partially cut off; and a structure in which the laminated two carbon layers are formed into a single carbon layer. The cross section of the sheath does not necessarily assume a completely round shape, and may assume an elliptical shape or a polygonal shape. No particular limitations are imposed on the interlayer distance ($d_{002}$) of carbon crystal layers. The interlayer distance ($d_{002}$) of the carbon crystal layers as measured by means of X-ray diffractometry is preferably 0.344 nm or less, more preferably 0.339 nm or less, much more preferably 0.338 nm or less. The thickness (Lc) of the carbon crystal layer in the C axis direction is preferably 40 nm or less.

The outer diameter of each fiber filament of the vapor grown carbon fiber employed is 2 to 1,000 nm, and the aspect ratio of the filament is 10 to 15,000. Preferably, the fiber filament has an outer diameter of 10 to 500 nm and a length of 1 to 100 μm (i.e., an aspect ratio of 2 to 2,000); or an outer diameter of 2 to 50 μm and a length of 0.5 to 50 μm (i.e., an aspect ratio of 10 to 25,000).

When the vapor grown carbon fiber is subjected to thermal treatment at 2,000° C. or higher after the carbon fiber has been produced, crystallinity of the carbon fiber is further enhanced, thereby increasing electrical conductivity. In such a case, an effective measure is addition of boron, which facilitates graphitization, to the carbon fiber before thermal treatment.

The amount of the vapor grown carbon fiber contained in the electrode material is preferably 0.01 to 20 mass %, more preferably 0.1 to 15 mass %, much more preferably 0.5 to 10 mass %. When the amount of the carbon fiber exceeds 20 mass %, electrical capacity is lowered, whereas when the amount of the carbon fiber is less than 0.01 mass %, internal electrical resistance at a low temperature (e.g., −35° C.) increases.

The amount of the vapor grown carbon fiber is preferably 0.1 to 30 parts by mass, more preferably 1 to 20 parts by mass on the basis of 100 parts by mass of Particle A.

When the vapor grown carbon fiber is inserted in microspaces formed by Particle A, three-dimensional networks are formed from the vapor grown carbon fiber per se or through entanglement of Particle A with the carbon fiber filaments having a size equal to or smaller than that of Particle A. Conceivably, the thus-formed networks, which function as cushion balls that absorb impact, can suppress the volume change of Particle A during charging/discharging cycles. Meanwhile, conceivably, the resilience of the negative electrode active substance increases by means of the resilience of the vapor grown carbon fiber, and the negative electrode exhibits enhanced restitution characteristics. Thus, the volume change of the entirety of the negative electrode can be suppressed, whereby cycle characteristics can be enhanced.

The vapor grown carbon fiber employed in the present invention has large amounts of irregularities and rough portions on its surface. Therefore, conceivably, the vapor grown carbon fiber exhibits enhanced adhesion to Particle A, and thus, even in the case where charging/discharging cycles are repeated, the negative electrode active substance and the carbon fiber which also serves as an electrical conductivity imparting agent adhere to and are not dissociated from each other, whereby electronic conductivity is maintained and cycle characteristics are enhanced.

When the vapor grown carbon fiber contains a large amount of branched carbon fiber, the aforementioned networks can be formed in an efficient manner, and thus high electronic conductivity and thermal conductivity are readily obtained. In addition, the carbon fiber can be dispersed in the active substance so as to wrap the active substance, and thus the strength of the negative electrode is enhanced, and good contact is established between the particles.

When the vapor grown carbon fiber is inserted between the particles, the negative electrode material exhibits enhanced effect of holding an electrolytic solution, and lithium ions are smoothly intercalated into or released from the electrode material even under low temperature conditions.

(1-6) Capacity

The capacity of the electrode material is preferably 400 mAh/g or higher, more preferably 400 to 2,000 mAh/g, much more preferably 400 to 1,000 mAh/g. The capacity of the electrode material is preferably high. However, when the amount of Si or Sn contained in the electrode material is increased, the particles are micronized as a result of volume change of Si or Sn particles, and the thus-micronized particles are separated from one another, leading to considerable deterioration of cycle characteristics. In addition, when the amount Si or Sn contained in the negative electrode material is increased, expansion/shrinkage of the negative electrode occurs during the course of charging/discharging, and the electrode material tends to be exfoliated from a copper plate.

Moreover, when the amount of silicon, tin, silicon compound and tin compound is regulated to 80 to 95 mass % on the basis of the entirety of Particle A constituting the electrode material so as to attain a capacity of 400 to 600 mAh/g, the resultant negative electrode material exhibits high practical performance; i.e., high capacity, excellent cycle characteristics, high rate of capacity retention and low internal electrical resistance.

[2] Mode 2

(2-1) Particles Serving as Nuclei

When employing carbon particles having a graphite structure for particles serving as nuclei and when a silicon and/or silicon compound is deposited onto at least a portion of the surface of the particles, the carbon particles are carbon particle having a graphite structure efficiently developed to be used as a negative electrode active substance for a secondary battery. For example, the interlayer distance ($d_{002}$) of the carbon crystal layers as measured by means of X-ray diffractometry is preferably 0.3395 nm or less, more preferably 0.3354 nm to 0.3370 nm.

The carbon particles may be produced by using particles capable of becoming carbon particles having a graphite structure through thermal treatment. Hereinafter, both of the particles and the carbon particles having a graphite structure are sometimes referred to as "carbonaceous particles".

The carbonaceous particles which may be employed include particles of a fired organic compound (a fired synthetic organic compound or a fired natural organic compound), fired mesocarbon microbeads, particles of a fired resin, particles of petroleum-based coke, particles of coal-based coke and particles of graphite such as natural graphite or artificial graphite. These types of particles may be employed singly or in combination of two or more species.

The particles may be a lump-like shape, a flaky shape, a spherical shape or a fibrous shape. Preferably, the particles assume a spherical shape or a lump-like shape.

The central particle size (D50) of the carbon particles as measured by use of a laser-diffraction-type particle size distribution measuring apparatus is preferably about 0.1 to about 100 μm more preferably 5 to 70 μm. Preferably, the carbon particles contain substantially no particles having a particle size of 3 μm or less and/or 85 μm or more.

The particle size is regulated within the above-preferred range for the following reasons. When the particle size of the carbon particles is small, the specific surface area of the particles increases and side reactions accompanying charging/discharging become significant, resulting in considerable lowering of charging/discharging efficiency. In contrast, when the particle size of the carbon particles is large, spaces formed between the particles become large, and thus packing density is lowered. In addition, since the number of contact points between adjacent particles is reduced, the number of current paths is reduced, resulting in considerable deterioration of characteristics under a load of large current. Meanwhile, a limitation is imposed on the thickness of a negative electrode, since the electrode must be placed in a limited space. However, in the case where the carbon particles having a large particle size is employed, the resultant negative electrode may fail to meet the requirement with respect to thickness.

In order to regulate the particle size, the above-mentioned technique of pulverization or classification may be employed.

The carbon material serving as a negative electrode active substance is required to exhibit large discharging capacity and high charging/discharging efficiency, which are attained through heating at 2,000° C. or higher.

In order to enhance the discharging capacity and charging/discharging efficiency, it is effective to enhance crystallinity of the carbon particles by adding a substance which facilitates graphitization, such as boron, to the carbon particles before thermal treatment.

Particles of silicon and/or silicon compound to be deposited onto the above-mentioned carbon particles (hereinafter referred to as Si/Si compound) may be a lump-like shape, a flaky shape, a spherical shape or a fibrous shape. Preferably, the Si/Si compound particles assume a spherical shape or a lump-like shape. The Si/Si compound may be silicon elemental substance, a silicon-atom-containing compound and/or a mixture of silicon-atom-containing compounds and may be one or more species selected from among silicon, silicon carbide, silicon dioxide and silicon nitride.

The central particle size (D50) of the Si/Si compound particles as measured by use of a laser-diffraction-type particle size distribution measuring apparatus is preferably about 0.1 to about 10 μm, more preferably 0.3 to 3 μm, for the following reasons. When the particle size is large, the particles are micronized through charging/discharging, leading to deterioration of cycle characteristics.

In order to regulate the particle size, any known technique of pulverization or classification may be employed. Specific examples of the apparatus employed for pulverization include a hammer mill, a jaw crusher and an impact mill. The classification may be air classification or classification employing a sieve. Examples of the apparatus employed for air classification include a turbo classifier and a turbo plex.

The amount of the Si/Si compound is preferably 1 to 20 mass %, more preferably 2 to 15 mass %, much more preferably 3 to 10 mass %, on the basis of the entirety of the carbon particles for the following reasons. When the amount of the Si/Si compound is increased, cycle characteristics are considerably deteriorated, although capacity is increased.

(2-2) Carbonaceous Material

At least a portion of the surface of the carbon particle employed in the present invention is coated by a carbonaceous material. The carbonaceous material is obtainable by depositing a composition containing a polymer onto at least a portion of the carbon particle and performing thermal treatment.

The polymer employed preferably exhibits adhesion to fibrous carbon and the Si/Si compound. When a polymer exhibiting adhesiveness is present between the carbon particles and the fibrous carbon or between the carbon particles and the Si/Si compound, so as to bring these materials into contact with each other, these materials are united through chemical bonding such as covalent bonds, van der Waals forces or hydrogen bonds, or through physical adhesion attained by diffusion of similar substances. Any polymer exhibiting adhesiveness may be employed in the present invention, so long as the polymer exhibits resistance against force caused by compression, bending, exfoliation, impact, tension, tearing, etc., when undergoing any treatment such as mixing, stirring, removal of solvent or thermal treatment, such that the polymer causes substantially no exfoliation or falling of the fibrous carbon.

Preferably, the polymer is the same as mentioned in above, that is, at least one species selected from the group consisting of phenolic resin, polyvinyl alcohol resin, furan resin, cellulose resin, polystyrene resin, polyimide resin and epoxy resin. More preferable polymers include phenolic resin and polyvinyl alcohol resin.

Among these polymers, glassy carbon obtained through carbonization of a thermosetting resin such as phenolic resin or furfuryl alcohol resin is known to exhibit excellent electrolytic-solution impermeability. Therefore, such glassy carbon is suitably employed for coating the surface of a carbon material that exhibits high reactivity with an electrolytic solution. In addition, such glassy carbon is easier to handle than is, for example, pitch. In a lithium secondary battery, a reaction in which lithium ions are occluded into or released from carbon particles, silicon and a silicon compound is repeated, and therefore, volume expansion/shrinkage of the carbon particles, silicon and silicon compound occurs as a result of occlusion/release of lithium ions, leading to falling or disintegration of the silicon or silicon compound, or falling or exfoliation of fibrous carbon. The polymer employed in the present invention is suitable for preventing such a phenomenon.

In the case where a phenolic resin and a drying oil or a fatty acid derived therefrom are employed, preferably, a step in which a composition containing fibrous carbon and Si/Si compound is deposited onto carbonaceous particles, and then the composition deposited onto the carbonaceous particles is cured is carried out 1 to 20 times, and subsequently the resultant carbonaceous particles is subjected to thermal treatment, from the viewpoints of reduction of the specific surface area of the carbonaceous particles, reduction of side reactions other than charging/discharging, which would occur on the surfaces of the particles, and enhancement of cycle characteristics.

A preferred amount of a drying oil or a fatty acid derived therefrom may be 5 to 50 parts by mass on the basis of 100 parts by mass of a phenolic resin obtained through condensation of phenol and formalin. When the amount of a drying oil or a fatty acid derived therefrom exceeds 50 parts by mass, adhesiveness is lowered, and the density of the fibrous carbon or Si/Si compound is decreased.

(2-3) Mixing and Removal of a Solvent

To deposit fibrous carbon and Si/Si compound onto the carbon particle having a graphite structure or the particle capable of becoming the carbon particle having a graphite structure by thermal treatment (carbonaceous particle) by the mediation of the composition containing a polymer, either of the following two methods is available:

a method of mixing the above-mentioned carbonaceous particle and a composition containing a polymer to deposit the composition onto the surface of the particle and then mixing the fibrous carbon and Si/Si compound thereto; or a method of mixing a composition containing a polymer, fibrous carbon and Si/Si compound and further mixing the carbonaceous particle thereto.

No particular limitations are imposed on the stirring method, and a stirring apparatus such as a ribbon mixer, a screw kneader, a Spartan ryuzer, a Lodige mixer, a planetary mixer or a general-purpose mixer may be employed.

The stirring temperature and stirring time are appropriately determined in accordance with, for example, the components and viscosity of the particles and the polymer. The stirring temperature is generally about 0° C. to about 50° C., preferably about 10° C. to about 30° C. Alternatively, in order to reduce the viscosity of the aforementioned mixture to 500 Pa·s or less at the mixing temperature, the mixing time is regulated and the composition is diluted with a solvent. In this case, any solvent may be employed, so long as the solvent exhibits good affinity with the polymer, the fibrous carbon and Si/Si compound. Examples of the solvent include alcohols, ketones, aromatic hydrocarbons and esters. Preferred examples include methanol, ethanol, butanol, acetone, methyl ethyl ketone, toluene, ethyl acetate and butyl acetate.

After completion of stirring, preferably, a portion or the entirety of the solvent is removed. Removal of the solvent may be carried out by means of a known technique such as hot air drying or vacuum drying.

The drying temperature varies depending on, for example, the boiling point and vapor pressure of the employed solvent. Specifically, the drying temperature is 50° C. or higher, preferably 100° C. to 1,000° C. inclusive, more preferably 150° C. to 500° C. inclusive.

Most of known heating apparatuses may be employed for heating and curing. However, from the viewpoint of productivity, an apparatus such as a rotary kiln or a belt-type continuous furnace, which enables continuous treatment, is preferably employed in a production process.

In case of employing phenolic resin as a polymer, the amount of the phenolic resin to be added is preferably 2 to 30 parts by mass, more preferably 4 to 25 parts by mass, much more preferably 6 to 18 parts by mass on the basis of 100 parts by mass of the carbon particles having a graphite structure or of the particles capable of becoming the carbon particles having a graphite structure.

(2-4) Thermal Treatment Conditions

In order to increase charging/discharging capacity due to intercalation of, for example, lithium ions, the crystallinity of the carbon particles must be enhanced. Since the crystallinity of carbon is generally enhanced in accordance with the highest temperature in thermal hysteresis (i.e., the highest thermal treatment temperature), from the viewpoint of enhancement of battery performance, thermal treatment is preferably carried out at a higher temperature. The thermal treatment temperature is preferably 2,000° C. or higher, more preferably 2,500° C. or higher, much more preferably 2,800° C. or higher, particularly preferably 3,000° C. or higher.

Preferably, the carbon particles are heated at the highest temperature in thermal hysteresis for a long period of time. However, since the carbon particles to be heated are in the form of finely divided particles, when thermal conduction reaches the center of each particle the carbon particles basically exhibit sufficient performance. From the viewpoint of production cost, a short period of heating time is preferred. For example, when carbonaceous powder having an average particle size of about 20 μm is heated, after the temperature of the center of each particle of the powder reaches the maximum temperature, the powder is maintained at the maximum temperature for 30 minutes or more, preferably 10 minutes or more, more preferably five minutes or more.

When a matrix of high carbon crystallinity, such as natural graphite or artificial graphite which has undergone thermal treatment, is coated with a coating material the coating material per se is required to undergo a certain level of thermal treatment after completion of coating. The thermal treatment is preferably carried out at 2,400° C. or higher, more preferably at 2,700° C. or higher, particularly preferably at 2,900° C. or higher. In this case, the center of the matrix is not necessarily heated to the maximum temperature, so long as adhesion of the resultant coating to the surface of the carbonaceous material, strength of the coating, etc. substantially meet practical requirements.

In the case where the carbon particles are subjected to thermal treatment by use of a known heating apparatus, when the temperature increasing rate falls within a range between the maximum and the minimum temperature increasing rate in the apparatus, the performance of the particles is not considerably affected. However, since the particles are in the form of powder and raise few problems such as cracking, which may occur in, for example, a molded material the temperature increasing rate is preferably high from the viewpoint of production cost. The time elapsed when the particles are heated from ambient temperature to the maximum temperature is preferably 12 hours or less, more preferably six hours or less, particularly preferably two hours or less.

Any known thermal treatment apparatus, such as an Acheson furnace or a direct electrical heating furnace, may be employed. Such an apparatus is advantageous from the viewpoint of production cost. However, preferably, a furnace having a structure such that the interior of the furnace can be filled with an inert gas such as argon or helium is employed, since the resistance of the particles may be lowered in the presence of nitrogen gas, and the strength of the carbonaceous material may be lowered through oxidation by oxygen. Preferred examples of such a furnace include a batch furnace whose interior enables evacuation and gas substitution, a batch furnace in which the interior atmosphere can be controlled by means of a tubular furnace, and a continuous furnace.

In order to enhance crystallinity of the carbon material, if desired, any known graphitization catalyst such as a boron compound, a beryllium compound, an aluminum compound or a silicon compound may be employed.

In a graphite network crystal structure, carbon atoms can be substituted by boron atoms. When such substitution occurs, restructuring of the crystal structure is considered to occur; i.e., a carbon-carbon bond is cleaved and then reconstituted. Therefore, when graphite particles of relatively poor crystallinity are subjected to such restructuring, the resultant particles may exhibit high crystallinity. The expression "a carbon coating layer contains boron (elemental boron)" refers to the case where a portion of incorporated boron atoms form a solid solution together with the carbon atoms of the carbon coating layer and is present on the surface of the carbon layer or between carbon-atom-layers of hexagonal network structure; or the case where carbon atoms are partially substituted by boron atoms.

No particular limitations are imposed on the boron compound which may be employed, so long as the boron compound generates boron through heating. Examples of the boron compound which may be employed include boron, boron carbide, boron oxide and organic boron oxide. The boron compound may assume a solid, liquid or gaseous form. Specific examples include elemental boron, boric acid ($H_3BO_3$), boric acid salts, boron oxide ($B_2O_3$), boron carbide ($B_4C$) and BN.

No particular limitations are imposed on the amount of a boron compound to be added, which depends on chemical properties and physical properties of the compound. For example, when boron carbide ($B_4C$) is added to the carbon particles, the amount of the boron carbide is preferably 0.05 to 10 parts by mass, more preferably 0.1 to 5 parts by mass, on the basis of 100 parts by mass of the carbon particles to be heated.

When the particle size of the carbon particles is regulated before thermal treatment, the particle size of the carbon material is not necessarily regulated after thermal treatment. However, when the carbon material has undergone fusion or aggregation, the material may be subjected to light pulverization, and then to air classification. Classification is preferably carried out through sieving by use of a meshed sieve, from the viewpoint of simplicity of operation.

The average particle size of the carbon material is 5 to 70 μm, preferably 8 to 30 μm, more preferably 10 to 25 μm. The average particle size can be measured by means of the laser diffraction-scattering method. When the average particle size is less than 5 μm, aspect ratio tends to become large and specific surface area tends to become large. For example, in the case of production of a battery electrode, in general, the carbon material is mixed with a binder to form a paste, and the resultant paste is applied to a collector. When the average particle size of the carbon material is less than 5 μm, the carbon material contains large amounts of finely divided particles having a size of less than 5 μm. Therefore, the viscosity of the paste is increased, and applicability of the paste is lowered.

Preferably, the carbon material contains particles having a particle size of 3 μm or less and particles having a particle size of 85 μm or more in an amount of 5 mass % or less. In this case, the average particle size of the carbon material is 8 to 30 μm. When the carbon material contains large particles having an average particle size of 85 μm or more, large amounts of irregularities are formed on the surface of the resultant electrode, thereby causing scratches on a separator to be employed in a battery.

(2-5) Fibrous Carbon

Fibrous carbon to be employed may be the same as mentioned in above, preferably vapor grown carbon fiber.

When the vapor grown carbon fiber is subjected to thermal treatment after the carbon fiber has been produced, crystallinity of the vapor grown carbon fiber is further increased, thereby increasing electrical conductivity. However, carrying out thermal treatment steps twice or more during the course of production of the carbon material is disadvantageous from the viewpoint of production cost. Therefore, preferably, a raw material of the carbon particles which has undergone pulverization and classification, non-graphitized vapor grown carbon fiber and Si/Si compound are bonded together by means of a polymer, and the resultant product is heated at 2,000° C. or higher, to thereby produce the electrode material containing vapor grown carbon fiber having high crystallinity.

(2-6) Capacity

The capacity of the carbon material is preferably 400 to 1,000 mAh/g, more preferably 400 to 800 mAh/g, much more preferably 400 to 600 mAh/g. The capacity of the carbon material is preferably high. However, when the amount of Si contained in the electrode material is increased, the Si particles are micronized when the resultant secondary battery undergoes repeated charging/discharging cycles, and the carbon particles are separated from one another, leading to considerable deterioration of cycle characteristics. In addition, when the amount of Si contained in the electrode material is increased, expansion/shrinkage of the negative electrode material occurs during the course of charging/discharging, and the electrode material tends to be exfoliated from a copper plate. When the amount of the Si/Si compound is regulated to 1 to 20 parts by mass on the basis of 100 parts by mass of the carbon particles, so as to attain a capacity of 400 to 600 mAh/g, the resultant electrode material exhibits high practical performance by virtue of excellent cycle characteristics and low expansion/shrinkage property of graphite.

[Secondary Battery]

Any known method can be employed for producing a lithium secondary battery from the electrode material of the present invention.

To be used for a lithium battery electrode, the electrode material preferably has a small specific surface area. The particles constituting the electrode material of the present invention has a specific surface area of 3 $m^2/g$ or less as measured by means of the BET method. When the specific surface area exceeds 3 $m^2/g$, surface activity of the above-mentioned particles is increased, and coulomb efficiency is lowered as a result of, for example, decomposition of an electrolytic solution. In order to increase capacity of a battery, the packing density of the above-mentioned particles must be increased. Therefore, each of the particles constituting the carbon material preferably assumes a virtually spherical shape. When the shape of each of the particles is represented by aspect ratio (i.e., the length of the major axis/the length of the minor axis), the aspect ratio is 6 or less, preferably 5 or less. The aspect ratio may be obtained by use of, for example, a micrograph of the particles. Alternatively, the aspect ratio may be calculated through the following procedure: the average particle size (A) of the particles is measured by means of the laser diffraction-scattering method; the average particle size (B) of the particles is measured by means of an electrical detection method (a Coulter counter method); each of the particles is regarded as a disk, with the bottom surface diameter of the disk being represented by (A); the volume (C) of the disk is calculated from the formula: $C=4/3 \times (B/2)^3 \pi$; the thickness (T) of the disk is calculated from the formula: $T=C/(A/2)^2 \pi$; and the aspect ratio is calculated as A/T.

In the case of a lithium battery electrode, when the electrode material to be employed exhibits good fillability and has high bulk density, the resultant electrode exhibits high discharging capacity per unit volume. The electrode material of the present invention has a tap bulk density of 0.8 g/cm$^3$ or more, preferably 0.9 g/cm$^3$ or more. The tap bulk density is measured through the following procedure: a predetermined mass of the carbon material (6.0 g) is placed in a measurement cell having a size of 15 mm$\phi$; the cell is placed in a tapping apparatus; the cell is allowed to fall freely 400 times under the following conditions: height of fall: 46 mm, tapping rate: 2 seconds/time; the volume of the carbon material is measured after completion of the 400 repetitions of free fall; and the bulk density of the carbon material is calculated by use of the above-measured mass and volume.

A lithium battery electrode can be produced through the following procedure: a binder is diluted with a solvent and then kneaded with the electrode material in a general manner, and the resultant mixture is applied to a collector (substrate).

Examples of the binder which may be employed include known binders such as fluorine-containing polymers (e.g., polyvinylidene fluoride and polytetrafluoroethylene) and rubbers (e.g., SBR (styrene-butadiene rubber)). Any known solvent suitable for a binder to be used may be employed. When a fluorine-containing polymer is employed as a binder, for example, toluene or N-methylpyrrolidone is employed as a solvent. When SBR is employed as a binder, for example, water is employed as a solvent.

The amount of the binder to be employed is preferably 1 to 30 parts by mass, particularly preferably about 3 to about 20 parts by mass, on the basis of 100 parts by mass of the electrode material.

Kneading of the negative electrode material with the binder may be carried out by use of any of known apparatuses such as a ribbon mixer, a screw kneader, a Spartan ryuzer, a Lodige mixer, a planetary mixer and a general-purpose mixer.

The thus-kneaded mixture may be applied to a collector by means of any known method. For example, the mixture is applied to the collector by use of a doctor blade, a bar coater or a similar apparatus, and then the resultant collector is subjected to molding through, for example, roll pressing.

Examples of the collector which may be employed include known materials such as copper, aluminum, stainless steel, nickel and alloys thereof.

Any known separator may be employed, but polyethylene- or polypropylene-made nonwoven fabric is particularly preferred.

In the lithium secondary battery of the present invention, the electrolytic solution may be a known organic electrolytic solution, and the electrolyte may be a known inorganic solid electrolyte or polymer solid electrolyte. From the viewpoint of electrical conductivity, an organic electrolytic solution is preferred.

Preferred examples of the organic solvent employed for preparing the organic electrolytic solution include ethers such as diethyl ether, dibutyl ether, ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, diethylene glycol dimethyl ether, and ethylene glycol phenyl ether; amides such as formamide, N-methylformamide, N,N-dimethylformamide, N-ethylformamide, N,N-diethylformamide, N-methylacetamide, N,N-dimethylacetamide, N-ethylacetamide, N,N-diethylacetamide, N,N-dimethylpropionamide, and hexamethylphosphoryl amide; sulfur-containing compounds such as dimethyl sulfoxide and sulfolane; dialkyl ketones such as methyl ethyl ketone and methyl isobutyl ketone; cyclic ethers such as ethylene oxide, propylene oxide, tetrahydrofuran, 2-methoxytetrahydrofuran, 1,2-dimethoxyethane, and 1,3-dioxolan; carbonates such as ethylene carbonate and propylene carbonate; $\gamma$-butyrolactone; N-methylpyrrolidone; acetonitrile; and nitromethane. More preferred examples include esters such as ethylene carbonate, butylene carbonate, diethyl carbonate, dimethyl carbonate, propylene carbonate, vinylene carbonate, and $\gamma$-butyrolactone; ethers such as dioxolan, diethyl ether, and diethoxyethane; dimethyl sulfoxide; acetonitrile; and tetrahydrofuran. Particularly, carbonate-based non-aqueous solvents such as ethylene carbonate and propylene carbonate are preferably employed. These solvents may be employed singly or in combination of two or more species.

A lithium salt is employed as a solute (electrolyte) which is dissolved in the aforementioned solvent. Examples of generally known lithium salts include $LiClO_4$, $LiBF_4$, $LiPF_6$, $LiAlCl_4$, $LiSbF_6$, LiSCN, LiCl, $LiCF_3SO_3$, $LiCF_3CO_2$ and $LiN(CF_3SO_2)_2$.

Examples of the polymer solid electrolyte include polyethylene oxide derivatives and polymers containing the derivatives, polypropylene oxide derivatives and polymers containing the derivatives, phosphoric acid ester polymers, and polycarbonate derivatives and polymers containing the derivatives.

In the lithium secondary battery containing the negative electrode material of the present invention, preferably, a lithium-containing transition metal oxide is employed as a positive electrode active substance. Preferably, the positive electrode active substance is an oxide predominantly containing lithium and at least one transition metal selected from among Ti, V, Cr, Mn, Fe, Co, Ni, Mo and W, in which the ratio by mol between lithium and the transition metal is 0.3 to 2.2. More preferably, the positive electrode active substance is an oxide predominantly containing lithium and at least one transition metal selected from among V, Cr, Mn, Fe, Co and Ni, in which the ratio by mol between lithium and the transition metal is 0.3 to 2.2. The positive electrode active substance may contain Al, Ga, In, Ge, Sn, Pb, Sb, Bi, Si, P, B, etc. in an amount of less than 30 mol % on the basis of the entirety of the transition metal present as a primary component. Among the aforementioned positive electrode active substances, a preferred substance is at least one species selected from among materials having a spinel structure and being represented by the formula $Li_xMO_2$ (wherein M represents at least one element selected from among Co, Ni, Fe and Mn, and x is 0 to 1.2) or the formula $Li_yN_2O_4$ (wherein N includes at least Mn, and y is 0 to 2).

Particularly preferably, the positive electrode active substance is at least one species selected from among materials containing $Li_yM_aD_{1-a}O_2$, wherein M represents at least one element selected from among Co, Ni, Fe and Mn; D represents at least one element selected from among Co, Ni, Fe, Mn, Al, Zn, Cu, Mo, Ag, W, Ga, In, Sn, Pb, Sb, Sr, B and P, with the proviso that the element corresponding to M being excluded; y is 0 to 1.2; and a is 0.5 to 1; or at Least one species selected from among materials having a spinel structure and being represented by the formula $Li_z(N_bE_{1-b})_2O_4$, wherein N represents Mn; E represents at least one element selected from among Co, Ni, Fe, Mn, Al, Zn, Cu, Mo, Ag, W, Ga, In, Sn, Pb, Sb, Sr, B and P; b is 1 to 0.2; and z is 0 to 2.

Specific examples of the positive electrode active substance include $Li_xCoO_2$, $Li_xNiO_2$, $Li_xMnO_2$, $Li_xCo_aNi_{1-a}O_2$, $Li_xCo_bV_{1-b}O_z$, $Li_xCo_bFe_{1-b}O_2$, $Li_xMn_2O_4$, $Li_xMn_cCo_{2-c}O_4$, $Li_xMn_cNi_{2-c}O_4$, $Li_xMn_cV_{2-c}O_4$ and $Li_xMn_cFe_{2-c}O_4$, wherein x is 0.02 to 1.2, a is 0.1 to 0.9, b is 0.8 to 0.98, c is 1.6 to 1.96, and z is 2.01 to 2.3. Examples of most preferred lithium-containing transition metal oxides include $Li_xCoO_2$, $Li_xNiO_2$, $Li_xMnO_2$, $Li_xCo_aNi_{1-a}O_2$, $Li_xMn_2O_4$ and $Li_xCo_bV_{1-b}O_z$, wherein x is 0.02 to 1.2, a is 0.1 to 0.9, b is 0.9 to 0.98, and z is 2.01 to 2.3. The value x is a value as measured before initiation of charging/discharging, and increases or decreases through charging/discharging.

No particular limitations are imposed on the average particle size of particles of the positive electrode active substance, but the average particle size is preferably 0.1 to 50 μm. Preferably, the volume of particles having a particle size of 0.5 to 30 μm is 95% or more on the basis of the entire volume of the positive electrode active substance particles. More preferably, the volume of particles having a particle size of 3 μm or less is 18% or less on the basis of the entire volume of the positive electrode active substance particles, and the volume of particles having a particle size of 15 μm to 25 μm inclusive is 18% or less on the basis of the entire volume of the positive electrode active substance particles. No particular limitations are imposed on the specific surface area of the positive electrode active substance, but the specific surface area as measured by means of the BET method is preferably 0.01 m$^2$/g to 50 m$^2$/g, particularly preferably 0.2 m$^2$/g to 1 m$^2$/g. When the positive electrode active substance (5 g) is dissolved in distilled water (100 ml), the pH of the supernatant of the resultant solution is preferably 7 to 12 inclusive.

No particular limitations are imposed on the elements (other than the aforementioned elements) which are required for producing a battery.

BEST MODE FOR CARRYING OUT THE INVENTION

The present invention will next be described in more detail with reference to representative examples, which should not be construed as limiting the invention thereto.

Method for Preparing Phenolic Resin for Deposition:

A phenolic resin which had been partially modified by use of tung oil was employed as a deposition material.

Tung oil (100 parts by mass), phenol (150 parts by mass) and nonylphenol (150 parts by mass) were mixed together, and the resultant mixture was maintained at 50° C. Sulfuric acid (0.5 parts by mass) was added to the mixture, and the resultant mixture was stirred, gradually heated, and maintained at 120° C. for one hour, to thereby allow addition reaction between the tung oil and the phenols to proceed. Subsequently, the temperature of the resultant reaction mixture was lowered to 60° C. or lower, and hexamethylenetetramine (6 parts by mass) and 37 mass % formalin (100 parts by mass) were added to the mixture. The resultant mixture was subjected to reaction at 90° C. for about two hours, and then subjected to dehydration under vacuum. Thereafter, the resultant mixture was diluted with methanol (100 parts by mass) and acetone (100 parts by mass), to thereby-yield a varnish having a viscosity of 20 mPa·s (at 20° C.). Hereinafter, the varnish is referred to as "varnish A".

Battery Evaluation Method:

(1) Preparation of Paste

KF Polymer L1320 (an N-methylpyrrolidone (NMP) solution product containing PVDF (12 mass %), product of Kureha Chemical Industry Co., Ltd.) (0.1 parts by mass) was added to a carbon raw material (1 part by mass), and the resultant mixture was kneaded by use of a planetary mixer, to thereby prepare a neat agent.

(2) Formation of Electrode

NMP was added to the neat agent so as to regulate the viscosity of the agent. The resultant mixture was applied onto a copper foil of high purity by use of a doctor blade so as to attain a thickness of 250 μm. The resultant product was dried under vacuum at 120° C. for one hour, and then subjected to punching, to thereby form an electrode having a size of 18 mmφ. The thus-formed electrode was sandwiched between super-steel-made pressing plates, and then subjected to pressing such that a pressure of $1 \times 10^3$ to $3 \times 10^3$ kg/cm$^2$ was applied to the electrode. Thereafter, the resultant electrode was dried in a vacuum drying apparatus at 120° C. for 12 hours, and was employed for evaluation.

(3) Production of Battery

A three-electrode cell was produced as follows. The below-described procedure was carried out in an atmosphere of dried argon having a dew point of −80° C. or lower.

In a polypropylene-made cell (inner diameter: about 18 mm) having a screw cap, separators (polypropylene-made microporous film (Celgard 2400)) sandwiched the carbon electrode with copper foil (positive electrode) which had been formed in (2) above and a metallic lithium foil (negative electrode), to thereby form a laminate. Subsequently, a metallic lithium foil serving as a reference electrode was laminated in a manner similar to that described above. Thereafter, an electrolytic solution was added to the cell, and the resultant cell was employed for testing.

(4) Electrolytic Solution

EC electrolytic solution: prepared by dissolving LiPF$_6$ (1 mol/liter), serving as an electrolyte, in a mixture of EC (ethylene carbonate) (8 parts by mass) and DEC (diethyl carbonate) (12 parts by mass).

(5) Charging/Discharging Cycle Test

Constant-current constant-voltage charging/discharging test was performed at a current density of 0.2 mA/cm$^2$ (corresponding to 0.1 C). Constant-current (CC) charging (i.e., intercalation of lithium ions into carbon) was performed at 0.2 mA/cm$^2$ while voltage was increased from rest potential to 0.002 V. Subsequently, constant-voltage (CV) charging was performed at 0.002 V, and charging was stopped when the current value decreased to 25.4 μA.

CC discharging (i.e., release of lithium ions from carbon) was performed at 0.2 mA/cm$^2$ (corresponding to 0.1 C), and was cut off at a voltage of 1.5 V.

EXAMPLE 1

Silicon material was subjected to pulverization and classification, to thereby prepare silicon particles having an average particle size (D50) of 20 μm. Separately, ethanol was added to varnish A, and the resultant mixture was stirred, to thereby completely dissolve the varnish A in the ethanol. The resultant solution was added to the above-prepared silicon particles (100 g) such that the amount of the modified phenolic resin solid became 10 mass % on the basis of the entirety of the silicon particles, and the resultant mixture was kneaded for 30 minutes by use of a planetary mixer. To the resultant mixture was added vapor grown carbon fiber which had undergone graphitization at 2,800° C. (average diameter of fiber filaments of the carbon fiber: 150 nm, average aspect ratio of the filaments: 100) (0.1 mass %), and the thus-obtained mixture was stirred. The resultant mixture was dried in a vacuum drying apparatus at 80° C. for two hours, to thereby remove the ethanol. Subsequently, the thus-dried mixture was placed in a heating furnace, and the interior of the furnace was evacuated and then filled with argon. Subsequently, the furnace was heated under a stream of argon gas. The temperature of the furnace was maintained at 2,900° C. for 10 minutes, and then the furnace was cooled to room temperature. Thereafter, the thus-heat-treated product was subjected to screening by use of a sieve of 63-μm mesh, to thereby yield a negative electrode material sample of an undersize of 63 μm. When the thus-obtained negative electrode material sample was observed under an electron microscope (SEM), fiber filaments of the vapor grown carbon fiber were found to be dispersed around each of the silicon particles. The thus-obtained negative electrode material sample of Example 1 was subjected to battery evaluation by use of a single-cell-type battery evaluation apparatus. The EC electrolytic solution was employed for battery evaluation. In the charging/discharging cycle test, the capacity at the 1st cycle and the capacity at the 50th cycle were measured. The results are shown in Table 1.

EXAMPLE 2

The procedure of Example 1 was repeated, except that the amount of vapor grown carbon fiber to be added was changed to 3 mass %, to thereby yield a negative electrode material sample. In the same manner as with the sample of Example 1, the above-obtained sample was subjected to battery evaluation by use of a single-cell-type battery evaluation apparatus. The EC electrolytic solution was employed for battery evaluation. In the charging/discharging cycle test, the capacity at the 1st cycle and the capacity at the 50th cycle were measured. The results are shown in Table 1.

EXAMPLE 3

The procedure of Example 1 was repeated, except that the amount of vapor grown carbon fiber to be added was changed to 10 mass %, to thereby yield a negative electrode material sample. In the same manner as with the sample of Example 1, the above-obtained sample was subjected to battery evaluation by use of a single-cell-type battery evaluation apparatus. The EC electrolytic solution was employed for battery evaluation. In the charging/discharging cycle test, the capacity at the 1st cycle and the capacity at the 50th cycle were measured. The results are shown in Table 1.

EXAMPLE 4

The procedure of Example 1 was repeated, except that silicon carbide particles adjusted to have an average particle size (D50) of 1 μm was employed in place of silicon particles, to thereby yield a negative electrode material sample. When the thus-obtained negative electrode material sample was observed under an electron microscope (SEM), fiber filaments of the vapor grown carbon fiber were found to be dispersed around each of the silicon carbide particles. The thus-obtained negative electrode material sample of Example 4 was subjected to battery evaluation by use of a single-cell-type battery evaluation apparatus. The EC electrolytic solution was employed for battery evaluation. In the charging/discharging cycle test, the capacity at the 1st cycle and the capacity at the 50th cycle were measured. The results are shown in Table 1.

EXAMPLE 5

Silicon particles having an average particle size (D50) of 20 μm were prepared. Vapor grown carbon fiber (average diameter of fiber filaments of the carbon fiber: 150 nm, average aspect ratio of the filaments: 100) (0.1 mass %) was added to the thus-prepared silicon particles, and the resultant mixture was stirred, to thereby yield a negative electrode material. The thus-obtained negative electrode material was subjected to battery evaluation by use of a single-cell-type battery evaluation apparatus. The EC electrolytic solution was employed for battery evaluation. In the charging/discharging cycle test, the capacity at the 1st cycle and the capacity at the 50th cycle were measured. The results are shown in Table 1.

EXAMPLE 6

The negative electrode material sample was obtained in the same way as in Example 1, except that tin particles adjusted to have an average particle size (D50) of 20 μm was employed in place of silicon particles. The thus-obtained negative electrode material was subjected to battery evaluation by use of a single-cell-type battery evaluation apparatus in the same manner as with the sample of Example 1. The EC electrolytic solution was employed for battery evaluation. In the charging/discharging cycle test, the capacity at the 1st cycle and the capacity at the 50th cycle were measured. The results are shown in Table 1.

COMPARATIVE EXAMPLE 1

Silicon particles having an average particle size (D50) of 20 μm were prepared. Separately, a phenol resin (10 g) was dissolved in isopropyl alcohol, to thereby prepare a solution. The solution was added to the above-prepared silicon particles such that the solid content became 10 mass % on the basis of the entirety of the silicon particles, and the resultant mixture was sufficiently stirred, followed by removal of the solvent. Thereafter, without addition of vapor grown carbon fiber, the resultant mixture was subjected to thermal treatment and screening in the same manner as in Example 1, to thereby form composite particles. The thus-formed particulate sample was mixed with carbon black (1 g), to thereby yield a negative electrode material.

The thus-obtained negative electrode material was subjected to battery evaluation by use of a single-cell-type battery evaluation apparatus. The EC electrolytic solution was employed for battery evaluation. In the charging/discharging cycle test, the capacity at the 1st cycle and the capacity at the 50th cycle were measured. The results are shown in Table 1.

COMPARATIVE EXAMPLE 2

Silicon particles having an average particle size (D50) of 20 μm were prepared, and the silicon particles were employed as a negative electrode material. The negative electrode material was subjected to battery evaluation by use of a single-cell-type battery evaluation apparatus. The EC electrolytic solution was employed for battery evaluation. In the charging/discharging cycle test, the capacity at the 1st cycle and the capacity at the 50th cycle were measured. The results are shown in Table 1.

COMPARATIVE EXAMPLE 3

Tin particles having an average particle size (D50) of 20 μm were prepared and were employed as a negative electrode material. The negative electrode material was subjected to battery evaluation by use of a single-cell-type battery evaluation apparatus. The EC electrolytic solution was employed for battery evaluation. In the charging/discharging cycle test, the capacity at the 1st cycle and the capacity at the 50th cycle were measured. The results are shown in Table 1.

TABLE 1

|  | Capacity (mAh/g) (1st cycle) | Capacity (mAh/g) (50th cycle) | capacity retention rate (%) |
| --- | --- | --- | --- |
| Ex. 1 | 831 | 322 | 39 |
| Ex. 2 | 824 | 428 | 52 |
| Ex. 3 | 804 | 589 | 73 |
| Ex. 4 | 486 | 388 | 80 |
| Ex. 5 | 1050 | 180 | 17 |
| Ex. 6 | 710 | 360 | 51 |
| Comp. Ex. 1 | 833 | 92 | 11 |
| Comp. Ex. 2 | 1058 | 83 | 8 |
| Comp. Ex. 3 | 900 | 100 | 10 |

As shown in Table 1, in the cases of Examples 1 to 6, the capacity at the 50th cycle is high as compared with the cases of Comparative Examples 1 to 3. Comparison between Examples 1 through 3 reveals that the larger the amount of the added vapor grown carbon fiber, the higher capacity retention rate, while capacity at the 1st cycle is slightly lowered. In the cases of Examples 1 to 6, capacity retention rate (i.e., capacity at the 50th cycle/capacity at the 1st cycle×100) is considerably-high, as-compared with the cases of Comparative Examples 1 to 3. Conceivably, in Examples 1 to 6, contact between the particles containing the compound containing a silicon atom and/or a tin atom is maintained during the course of charging/discharging cycles, and expansion or shrinkage of the particles is suppressed, thus attaining high capacity retention rate and high capacity.

EXAMPLE 7

Natural graphite was subjected to pulverization and classification, to thereby prepare carbon particles having an average particle size (D50) of 20 μm. The thus-prepared carbon particles (100 g) were mixed with silicon carbide (10 g). Separately, ethanol was added to varnish A, and the resultant mixture was stirred, to thereby completely dissolve the varnish A in the ethanol. The resultant solution was added to the above-obtained mixture such that the amount of the modified phenolic resin solid became 10 mass %, and the resultant mixture was kneaded for 30 minutes by use of a planetary mixer. To the resultant mixture was added vapor grown carbon fiber which had undergone graphitization at 2,800° C. ($d_{002}$: 0.339 nm, average outer diameter of fiber filaments of the carbon fiber: 150 nm, average aspect ratio of the filaments: 200) (3 mass %), and the thus-obtained mixture was kneaded. The thus-kneaded mixture was dried in a vacuum drying apparatus at 80° C. for two hours, to thereby remove the ethanol. Subsequently, the thus-dried product was placed in a heating furnace, and the interior of the furnace was evacuated and then filled with argon. Subsequently, the furnace was heated under a stream of argon gas. The temperature of the furnace was maintained at 2,900° C. for 10 minutes, and then the furnace was cooled to room temperature. Thereafter, the thus-heat-treated product was subjected to screening by use of a sieve of 63-μm mesh, to thereby yield the powdery carbon material of the present invention of an undersize of 63 μm. When the thus-obtained carbon material was observed under an electron microscope (SEM), the carbonaceous powder was found to have fibrous carbon (i.e., the vapor grown carbon fiber) on the particle surfaces of the powder. The powdery carbon material was subjected to battery evaluation by use of a single-cell-type battery evaluation apparatus. The EC electrolytic solution was employed for battery evaluation. In the charging/discharging cycle test, the capacity at the 1st cycle and the capacity at the 50th cycle were measured. The results are shown in Table 2.

EXAMPLE 8

The procedure of Example 7 was repeated, except that the amount of silicon carbide to be added was changed to 5 g. In the same manner as with the sample of Example 7, the thus-obtained sample was subjected to battery evaluation by use of a single-cell-type battery evaluation apparatus. The EC electrolytic solution was employed for battery evaluation. In the charging/discharging cycle test, the capacity at the 1st cycle and the capacity at the 50th cycle were measured. The results are shown in Table 2.

EXAMPLE 9

The procedure of Example 7 was repeated, except that the amount of silicon carbide to be added was changed to 3 g. In the same manner as with the sample of Example 7, the thus-obtained sample was subjected to battery evaluation by use of a single-cell-type battery evaluation apparatus. The EC electrolytic solution was employed for battery evaluation. In the charging/discharging cycle test, the capacity at the 1st cycle and the capacity at the 50th cycle were measured. The results are shown in Table 2.

COMPARATIVE EXAMPLE 4

A phenolic resin (10 g) was dissolved in isopropyl alcohol to thereby prepare a solution. Separately, silicon carbide (2 g) whose average particle size (D50) had been regulated to 2 μm was mixed with carbon black (1 g). The resultant mixture was added to the above-prepared solution, the resultant mixture was completely stirred, and then the solvent was removed from the mixture. Thereafter, the resultant product was subjected to thermal treatment in argon gas at 1,000° C. for 180 minutes, to thereby yield composite particles.

Subsequently, the above-obtained composite particles (5 g) was added to and mixed with natural graphite (95 g) whose average particle size (D50) had been regulated to 20 μm, and the resultant mixture was wet-mixed with isopropyl alcohol. The resultant mixture was mixed with a solution prepared by dissolving a phenolic resin (10 g) in isopropyl alcohol, and then the isopropyl alcohol was evaporated, to thereby yield natural graphite composite particles.

The thus-obtained natural graphite composite particles were subjected to thermal treatment at 1,000° C., and the thus-treated product was employed as a sample of Comparative Example 4. In the charging/discharging cycle test, the capacity at the 1st cycle and the capacity at the 50th cycle were measured. The results are shown in Table 2.

TABLE 2

| Sample | Capacity (mAh/g) | | capacity retention rate (%) |
| --- | --- | --- | --- |
| | 1st cycle | 50th cycle | |
| Example 7 | 425 | 382 | 91 |
| Example 8 | 390 | 355 | 91 |
| Example 9 | 380 | 350 | 91 |
| Comparative Example 4 | 425 | 297 | 70 |

As shown in Table 2, in the cases of Examples 7 to 9, the capacity at the 50th cycle is high as compared with the case of the Comparative Example 4. Comparison between Examples 7 to 9 reveals that the larger the amount of the added silicon carbide, the higher the capacity. In the cases of Examples 7 to 9, capacity retention rate (i.e., capacity at the 50th cycle/ capacity at the 1st cycle×100) is high, as compared with the case of the Comparative Example 4. Conceivably, in the cases of Examples 7 to 9, contact between the carbon particles is maintained during the course of charging/discharging cycles, and expansion or shrinkage of the particles is suppressed, thus attaining high capacity retention rate and high capacity.

INDUSTRIAL APPLICABILITY

A non-aqueous electrolyte secondary battery using the electrode material of the present invention for a negative electrode has high discharging capacity and is excellent in cycle characteristics and charge-discharge characteristics under large current.

The electrode material containing a mixture of vapor grown carbon fiber and particles comprising as nuclei at least one member of a silicon particle, tin particle, particle containing a lithium-ion-intercalatable/releasable silicon compound and particle containing a lithium-ion-intercalatable/ releasable tin compound maintains an electrical conduction path between the particles, and thereby lowers the electrical resistance of an electrode formed of the electrode material and increases discharging potential, as compared with the case of an electrode material containing no vapor grown carbon fiber. Addition of the vapor grown carbon fiber attains the following effects: sufficient contact between the particles is maintained even in the case where charging/discharging is repeatedly carried out and cycle characteristics are enhanced. Cycle characteristics at low temperature are enhanced as well because of, in addition to the above-described reasons, smooth migration of electrical charges, and an increase in internal electrical resistance is suppressed.

Generally, a silicon-containing negative electrode material has a problem in exhibiting a discharging potential lower than that of a graphite-based negative electrode material. However, use of the electrode material which contains carbon particles having a graphite structure and serving as nuclei, and comprises silicon and/or silicon compound and fibrous carbon deposited onto at least a portion of the surfaces of the carbon particle enables to maintain an electrical conduction path between the particles, lower the electrical resistance of an electrode formed of the carbon material, and increase discharging potential. The fibrous carbon contained in the carbon material attains the following effects: sufficient contact between the particles is maintained even in the case where charging/discharging is repeated, and cycle characteristics of a secondary battery are enhanced.

The invention claimed is:

1. An electrode material comprising carbon particles containing a carbon nucleus having a graphite structure and having on at least a portion of the nucleus surface silicon and/or silicon compound in the form of fine particles and fibrous carbon by the mediation of a carbonaceous material, wherein the carbonaceous material is obtained through thermal treatment of a composition containing a polymer.

2. The electrode material as claimed in claim 1, wherein the amount of the silicon and/or silicon compound is 1 to 20 mass %.

3. The electrode material as claimed in claim 1, wherein the polymer contains at least one species selected from the group consisting of phenolic resin, polyvinyl alcohol resin, furan resin, cellulose resin, polystyrene resin, polyimide resin and epoxy resin.

4. The electrode material as claimed in claim 1, wherein the composition containing a polymer is a composition containing phenolic resin, and a drying oil or a fatty acid derived therefrom.

5. The electrode material as claimed in claim 1, wherein the carbon particles having a graphite structure and/or the carbonaceous material contain boron.

6. The electrode material as claimed in claim 1, wherein the fibrous carbon contains carbon having, at a (002) plane, an average interlayer distance ($d_{002}$) of 0.344 nm or less as measured by means of X-ray diffractometry.

7. The electrode material as claimed in claim 1, wherein the fibrous carbon is vapor grown carbon fiber, each fiber filament of the carbon fiber including a hollow space extending along its center axis and having an outer diameter of 2 to 1,000 nm and an aspect ratio of 10 to 15,000.

8. The electrode material as claimed in claim 7, wherein the vapor grown carbon fiber contains branched carbon fiber.

9. The electrode material as claimed in claim 7, wherein the amount of the vapor grown carbon fiber is 0.1 to 30 parts by mass on the basis of 100 parts by mass of the carbon particles having a graphite structure.

10. The electrode material as claimed in claim 1, wherein the carbon particles having a graphite structure have an average particle size of 5 μm to 70 μm.

11. The electrode material as claimed in claim 10, wherein the carbon particles having a graphite structure contain particles having an average particle size of 3 μm or less and/or 85 μm or more in an amount of 5 mass % or less.

12. The electrode material as claimed in claim 1, wherein the carbon particles having a graphite structure are coated with the carbonaceous material, and the thickness of the carbonaceous material coating is 1 to 30,000 nm.

13. The electrode material as claimed in claim 1, wherein the silicon compound is at least one species selected from among silicon carbide, silicon dioxide and silicon nitride.

14. An electrode paste comprising an electrode material as claimed in claim 1 and a binder.

15. An electrode comprising an electrode paste as claimed in claim 14.

16. A secondary battery comprising an electrode as claimed in claim 15.

17. The secondary battery as claimed in claim 16, which comprises a non-aqueous electrolytic solvent and an electrolyte, wherein the non-aqueous electrolytic solvent is at least one species selected from the group consisting of ethylene carbonate, diethyl carbonate, dimethyl carbonate, methyl ethyl carbonate, γ-butyrolactone and propylene carbonate.

18. A method for producing an electrode material comprising carbon particles containing a carbon nucleus having a graphite structure and having on at least a portion of the nucleus surface silicon and/or silicon compound in the form of fine particles and fibrous carbon by the mediation of a carbonaceous material, wherein the carbonaceous material is obtained through thermal treatment of a composition containing a polymer, said method comprising;

a step of depositing a composition containing a polymer onto at least a portion of the surfaces of carbonaceous particles;

a step of mixing the carbonaceous particles with fibrous carbon and silicon and/or silicon compound, to thereby deposit the fibrous carbon and silicon and/or silicon compound onto the carbonaceous particles by the mediation of the composition containing a polymer; and a subsequent step of thermally treating the resultant carbonaceous particles.

19. The method for producing an electrode material as claimed in claim 18, wherein the polymer contains a polymer exhibiting adhesion to carbon.

20. The method for producing an electrode material as claimed in claim 18, wherein the polymer contains at least one species selected from the group consisting of phenolic resin, polyvinyl alcohol resin, furan resin, cellulose resin, polystyrene resin, polyimide resin and epoxy resin.

21. The method for producing an electrode material as claimed in claim 18, wherein the polymer contains a phenolic resin, and a drying oil or a fatty acid derived therefrom.

22. The method for producing an electrode material as claimed in claim 18, wherein a boron compound is added to the carbonaceous particles in the thermal treatment step.

23. The method for producing an electrode material as claimed in claim 18, wherein the thermal treatment step is carried out at a temperature of at least 2,000° C.

24. The method for producing an electrode material as claimed in claim 18, wherein the fibrous carbon is vapor grown carbon fiber, and the vapor grown carbon fiber is mixed with the carbonaceous particles such that the amount of the vapor grown carbon fiber is 0.1 to 30 parts by mass on the basis of 100 parts by mass of the carbonaceous particles.

25. The electrode material produced through a method as claimed in claim 18.

* * * * *